US009551392B2

(12) United States Patent
Bogoslofski et al.

(10) Patent No.: US 9,551,392 B2
(45) Date of Patent: Jan. 24, 2017

(54) SHOCK ABSORBING SECUREMENT DEVICE

(71) Applicant: Thule Sweden AB, Hillerstorp (SE)

(72) Inventors: Kevin Bogoslofski, Southington, CT (US); Timothy Makris, Sandy Hook, CT (US); Gregor Weaver, Waterbury, CT (US); John Laverack, Southbury, CT (US); Keith Prescott, Cambridge, VT (US)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 14/747,737

(22) Filed: Jun. 23, 2015

(65) Prior Publication Data

US 2015/0285324 A1 Oct. 8, 2015

Related U.S. Application Data

(63) Continuation of application No. 13/548,701, filed on Jul. 13, 2012, now Pat. No. 9,068,619.

(60) Provisional application No. 61/508,599, filed on Jul. 15, 2011.

(51) Int. Cl.
*F16F 1/373* (2006.01)
*B60R 9/10* (2006.01)
*B62H 3/02* (2006.01)

(52) U.S. Cl.
CPC ............... *F16F 1/3732* (2013.01); *B60R 9/10* (2013.01); *B62H 3/02* (2013.01); *F16F 1/373* (2013.01); *Y10S 224/924* (2013.01)

(58) Field of Classification Search
CPC ...... F16F 1/3732; B62H 3/02; Y10S 224/924; B60R 9/10; B60R 9/042; B60R 9/048

USPC ................. 224/532, 924; 267/141, 141.2
See application file for complete search history.

(56) References Cited

U.S. PATENT DOCUMENTS

| 2,641,434 | A | * | 6/1953 | Henshaw | F16F 1/3732 16/42 R |
|---|---|---|---|---|---|
| 2,666,340 | A | | 1/1954 | Hunt | |
| 5,259,542 | A | | 11/1993 | Newbold et al. | |
| 6,386,407 | B1 | * | 5/2002 | Erickson | B60R 9/10 224/282 |
| 7,213,731 | B1 | | 5/2007 | Kolda | |
| 7,757,917 | B2 | * | 7/2010 | Bogoslofski | B60R 9/06 224/533 |
| 7,810,685 | B2 | * | 10/2010 | Bove | B60R 9/06 211/19 |
| 8,141,760 | B2 | | 3/2012 | Kuschmeader et al. | |
| 8,220,681 | B2 | | 7/2012 | Farber | |
| 8,348,113 | B2 | | 1/2013 | Huang | |
| 2001/0040139 | A1 | | 11/2001 | Dean et al. | |

OTHER PUBLICATIONS

Chinese Patent Office, Office Action dated Nov. 8, 2012 in corresponding Chinese Patent Application No. 2012 20344129.0, 1 page.

* cited by examiner

*Primary Examiner* — Vishal Sahni
(74) *Attorney, Agent, or Firm* — Sterne, Kessler, Goldstein & Fox P.L.L.C.

(57) ABSTRACT

A shock absorbing cradle for supporting a bicycle on an arm of a bicycle carrier. The cradle includes an arm receiving base having a bicycle carrier arm engaging surface and a floating carriage releasably coupled to the arm receiving base. The floating carriage includes an upper portion having a bicycle engaging surface and a resilient member disposed between the upper portion and the arm receiving base.

19 Claims, 10 Drawing Sheets

SHOCK ABSORBING SECUREMENT DEVICE

CROSS-RELATED APPLICATIONS

This application claims the benefit of U.S. Provisional Application No. 61/508,599, entitled "Shock Absorbing Securement Device," filed on Jul. 15, 2011, and U.S. application Ser. No. 13/548,701, filed on Jul. 13, 2012, which are incorporated herein by reference in their entireties.

FIELD OF TECHNOLOGY

The instant disclosure relates to transport carriers, and more specifically, to shock absorbing securement devices.

BACKGROUND OF THE INVENTION

Transportation of equipment, especially sports equipment, such as one or more bicycles, often involves the use of a carrier frame attached to a carrying vehicle. Sports equipment can be carried on the carrier frames for different applications. The securement devices affix the sports equipment to the carrier frame which in turn is affixed to the vehicle.

BRIEF DESCRIPTION OF THE DRAWINGS

Implementations of the present application will now be described, by way of example only, with reference to the attached Figures, wherein.

DETAILED DESCRIPTION

Figure 1:
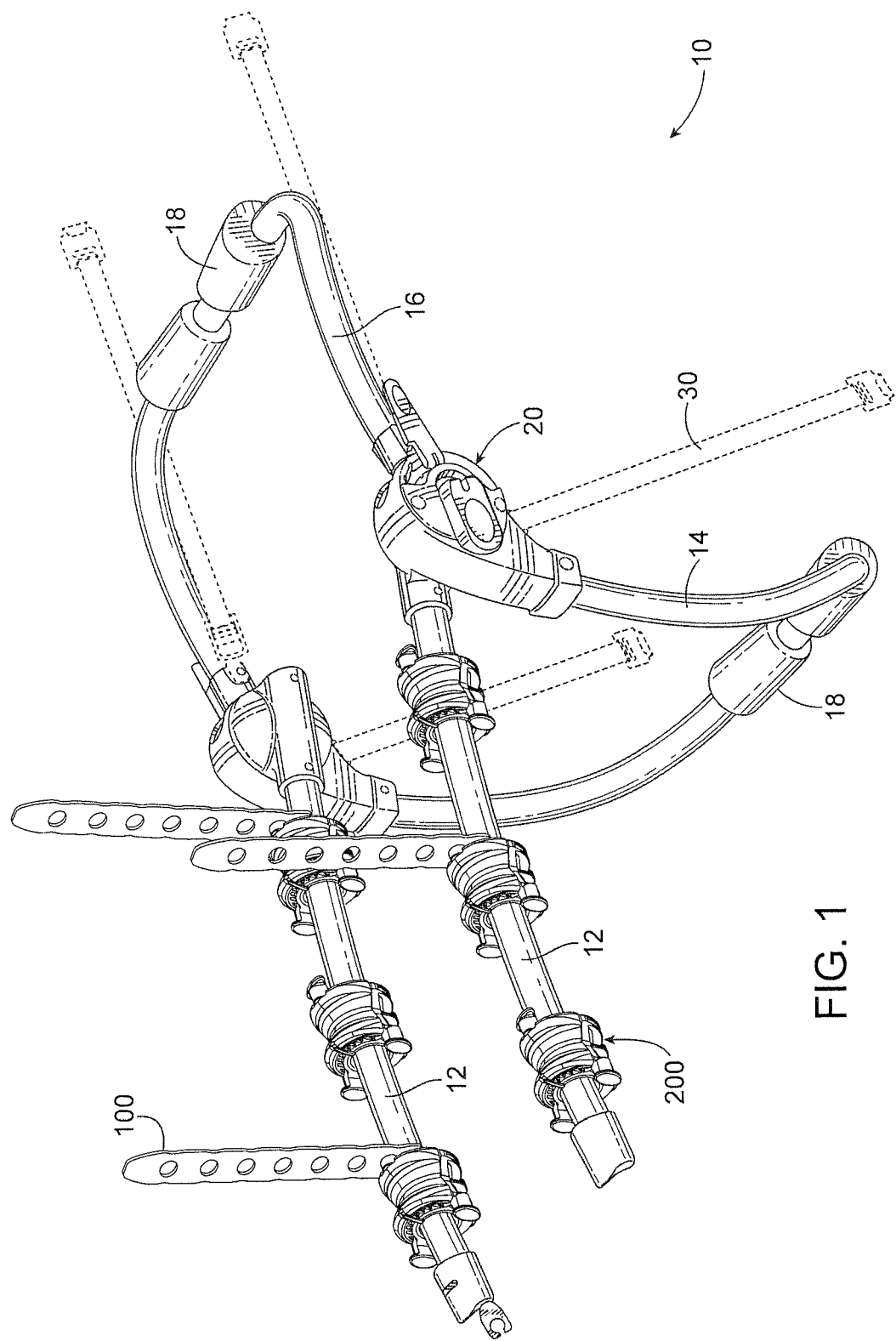
FIG. 1 is a perspective view of a carrier having a shock absorbing securement device in the form of a shock absorbing cradle in accordance with an exemplary implementation.

It will be appreciated that for simplicity and clarity of illustration, where appropriate, reference numerals have been repeated among the different Figures to indicate corresponding or analogous elements. In addition, numerous specific details are set forth in order to provide a thorough understanding of the implementations described herein. However, it will be understood by those of ordinary skill in the art that the implementations described herein can be practiced without these specific details. In other instances, methods, procedures and components have not been described in detail so as not to obscure the related relevant function being described. Also, the description is not to be considered as limiting the scope of the implementations described herein.

The present disclosure presents a shock absorbing securement device for anchoring a bicycle frame tube to a bicycle carrier. The shock absorbing securement device can include a bicycle carrier engaging surface. The shock absorbing securement device can also include a bicycle frame tube engaging surface positioned at a distance away from the carrier engaging surface in a bicycle transporting orientation. The shock absorbing securement device can also include a resilient force-responsive contraction/expansion mechanism biased toward an expanded configuration and coupled between the bicycle frame tube engaging surface and the bicycle carrier engaging surface whereby travel of the bicycle frame tube engaging surface relative to the bicycle carrier engaging surface is accommodated.

The shock absorbing securement device can be implemented on a variety of different bicycle carriers. The example presented herein and shown in the illustrations is for a bicycle frame carrier. Other implementations can include other securement mechanisms to couple the bicycle to a vehicle. In other embodiments, the shock absorbing securement device can be implemented to provide the shock absorbing qualities as described herein to secure other objects on carrying vehicles.

FIG. 1 illustrates a perspective view of a carrier 10 having shock absorbing securement devices coupled thereto. As illustrated in FIG. 1, the shock absorbing securement devices are shock absorbing cradles 200. The shock absorbing cradles 200 are coupled to an arm tube 12. The arm tube engaging surface of the shock absorbing cradle 200 can be configured to slide along the arm tube 12. The friction fit of the arm tube engaging surface can maintain the position of the shock absorbing cradle 200 on the arm tube 12.

The carrier can also include a top vehicle tube 16 and a bottom vehicle tube 14 that are adjustable relative to one another, for example via a hub 20. The relative angle of the top vehicle tube 16 relative to the bottom vehicle tube 14 allows for the mounting of the carrier 10 on a variety of different vehicles. The carrier 10 can be secured to the vehicle via vehicle straps 30 that are adjustable to hold the carrier 10 in place. In order to protect the paint of the vehicle, bumpers 18 can be affixed to the top vehicle tube 16 and bottom vehicle tube 14.

Figure 2:
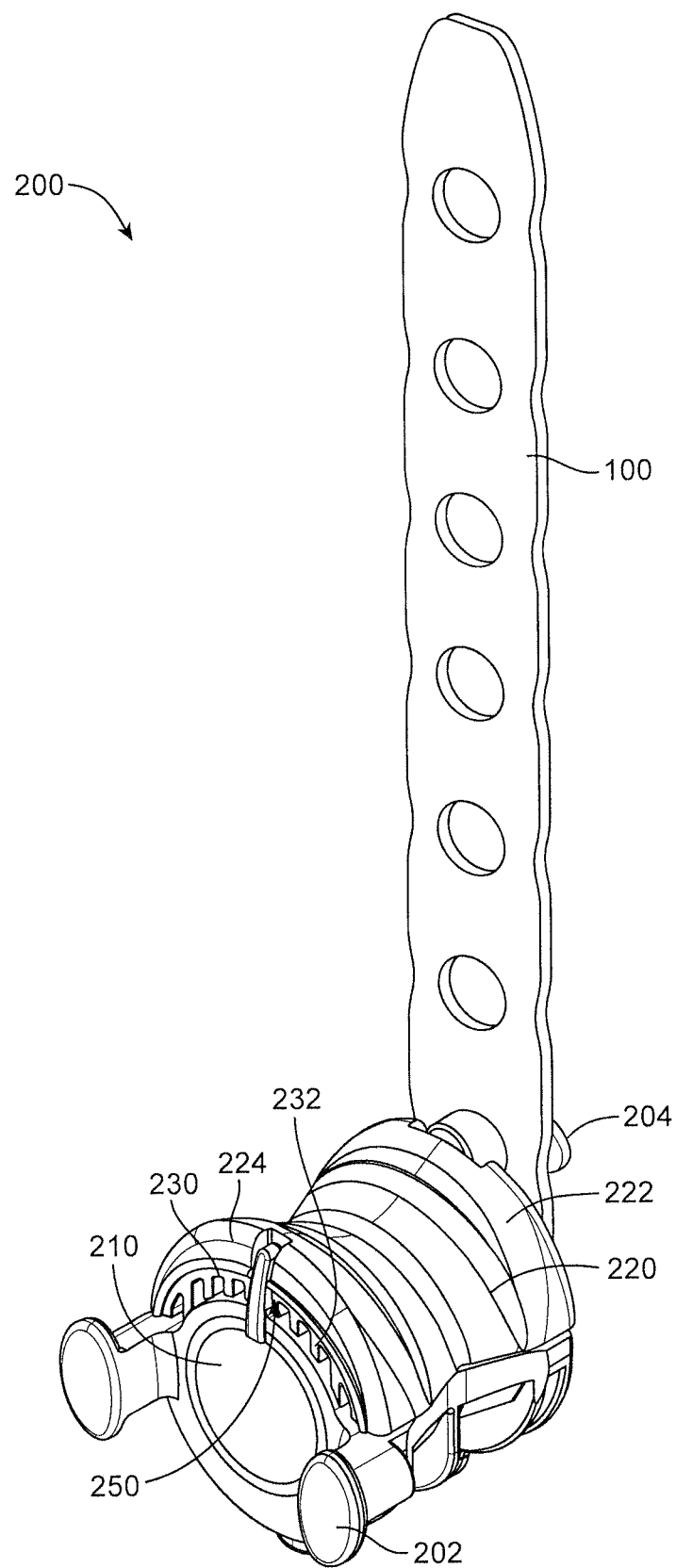
FIG. 2 is a perspective view of an exemplary shock absorbing cradle in accordance with an exemplary implementation.

FIG. 2 is a perspective view of a shock absorbing cradle 200 according to an exemplary embodiment. The components of the shock absorbing cradle 200 as illustrated in FIG. 2 are exemplary only and features can be omitted or added without departing from this disclosure. A securement strap 100 can be coupled to the shock absorbing cradle 200 at one or more points. For example the securement strap 100 can be coupled at a first anchor 204. The securement strap 100 can also be coupled at a second anchor 202 thereby holding a bicycle top tube in place against the shock absorbing cradle 200.

The shock absorbing cradle 200 as illustrated in FIG. 2 can include a bicycle carrier arm tube engaging surface 210. The arm tube engaging surface 210 can be configured to slidingly engage an arm tube 12 of a bicycle carrier as described above. The shock absorbing cradle 200 can further include a bicycle top tube engaging surface 220 above the arm tube engaging surface 210 in a bicycle transporting orientation. The bicycle top tube engaging surface 220 is configured to engage with the top tube of a bicycle. The top tube engaging surface 220 supports the bicycle.

Figure 3:
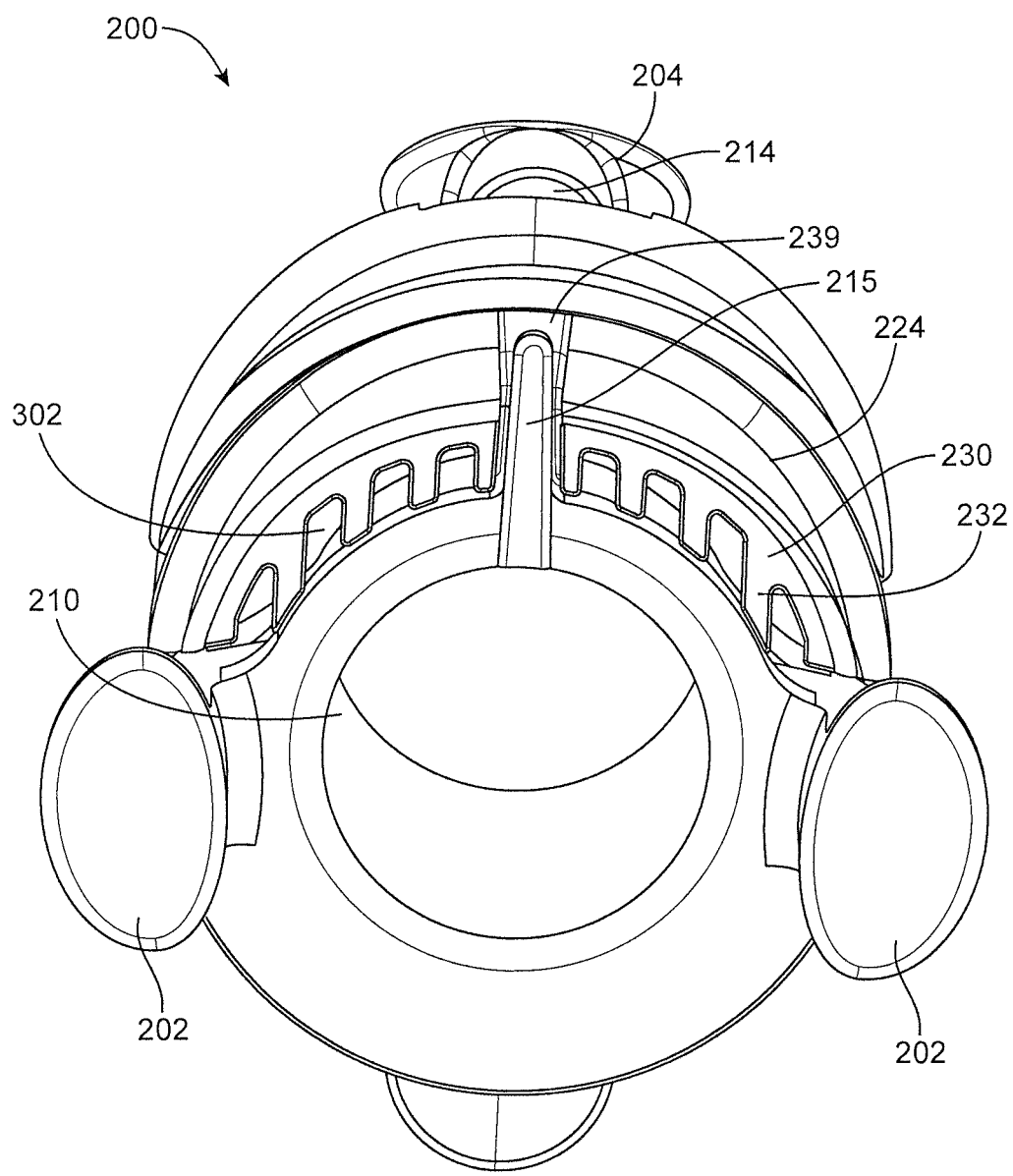
FIG. 3 is a front elevation view of the shock absorbing cradle illustrated in FIG. 2.

The shock absorbing cradle 200 can further include a resilient force-responsive contraction/expansion mechanism 230 biased toward an expanded configuration and coupled between the bicycle top tube engaging surface 220 and the arm tube engaging surface 210 whereby travel of the bicycle top tube engaging surface 220 relative to the arm tube engaging surface 210 is accommodated. The configuration of the resilient force-responsive contraction/expansion mechanism 230 protects the bicycle during transportation by allowing for absorption of forces exerted by the carrier on the bicycle. In the illustrated example, the contraction/expansion mechanism 230 maintains the bicycle top tube engaging surface 220 and the arm tube engaging surface 210 at a first distance, one from the other, in the expanded configuration. The contraction/expansion mechanism 230 permits the bicycle top tube engaging surface 220 to travel toward the arm tube engaging surface 210 under the influence of a shock force induced by a sharp rise in a bicycle carrier arm 12 upon which the cradle 200 is mounted. The expanded configuration is illustrated in FIGS. 2 and 3. As the bicycle top tube engaging surface 220 travels closer to the arm tube engaging surface 210 causing a compressed configuration, the contraction/expansion mechanism 230 absorbs the shock force.

In at least one implementation, the contraction/expansion mechanism 230 maintains the bicycle top tube engaging surface 220 and the arm tube engaging surface 210 at a first distance, one from the other, in the expanded configuration. The contraction/expansion mechanism 230 permits the bicycle top tube engaging surface 220 to travel toward the arm tube engaging surface 210 under the weight of a bicycle mounted on the cradle 200. The contraction/expansion mechanism 230 can further travel toward the arm tube engaging surface 210 when a shock force is imparted towards the bicycle. In at least one implementation, the bicycle top tube engaging surface 220 is at least five millimeters closer to the arm tube engaging surface 210 in a compressed configuration than in the expanded configuration. In at least one implementation, the bicycle top tube engaging surface 220 is at least two millimeters closer to the arm tube engaging surface 210 in a compressed configuration than in the expanded configuration. In at least one implementation, the bicycle top tube engaging surface 220 is at least ten millimeters closer to the arm tube engaging surface 210 in a compressed configuration than in the expanded configuration. In other implementations, the bicycle top tube engaging surface 220 can be any distance closer to the arm tube engaging surface 210, in the compressed configuration than in the expanded configuration, that allows for the absorption of shock. The range of travel of the top tube engaging surface 220 relative to the arm tube engaging surface 210 allows for absorption of the shock. While the increased distance can provide for increased shock absorption, it can be important to constrain the motion so as to prevent the bicycle from becoming unattached to the shock absorbing cradle 200.

As illustrated in FIG. 3, the contraction/expansion mechanism 230 can define a voidspace 302 between the bicycle top tube engaging surface 220 and the arm tube engaging surface 210. When the bicycle top tube engaging surface 220 and the arm tube engaging surface 210 due to a force or shock applied to carrier 200 (for example, to the bicycle top tube engaging surface 220), the contraction/expansion mechanism 230 can absorb the force or shock by compressing or deflecting at least a portion of the contraction/expansion mechanism 230 into the voidspace 302. As the contraction/expansion mechanism 230 deflects into the voidspace 302, the contraction/expansion mechanism 230 can accommodate the travel of the bicycle top tube engaging surface 220 and the arm tube engaging surface 210, when the force or shock is placed on the bicycle top tube engaging surface 220. In another implementation, the contraction/expansion mechanism 230 can define a voidspace 302 between the bicycle top tube engaging surface 220 and the arm tube engaging surface 210 such that when the bicycle top tube engaging surface 220 travels toward the arm tube engaging surface 210, at least a portion of the bicycle top tube engaging surface 220 can deflect into or be compressed into or towards the voidspace 302 to absorb any shock or force load placed on the carrier 200.

In one implementation, the resilient force-responsive contraction/expansion mechanism 230 can include at least one flexible rib 232 substantially vertically oriented in the expanded configuration. In the illustrated example, a plurality of flexible ribs 232 is included. These flexible ribs 232 can absorb the shock load. The ribs 232 can absorb the shock by both being compressed and deflected. For example, in FIG. 3, the plurality of ribs 232 can divide the voidspace 302 into a plurality of voidspaces 302. When the ribs 232 absorb the shock exerted by the carrier on the bicycle by being compressed and deflected, the ribs 232 can be compressed and deflected into the voidspace 302 or void spaces 302 adjacent the rib 232. In other embodiments, the resilient force-responsive contraction/expansion mechanism 230 can include a resilient member chosen from the group of a flexible rib 232, a spring, and a foamed block. Other damper systems can be implemented as well. Additionally, in one embodiment, a combination of one or more of the above resilient members or damper systems can be implemented.

As illustrated in FIGS. 2 and 3, the resilient force-responsive contraction/expansion mechanism 230 includes a plurality of flexible ribs 232. A majority of the plurality of ribs 232 can be substantially vertically oriented in the expanded configuration. The size and number of the ribs 232 can vary or be uniform. For example, the ribs on the outer edges of the resilient force-responsive contraction/expansion mechanism 230 can be shorter. Furthermore, the spacing of the ribs 232 can be adapted in view of the force load expected. The ribs 232 of the resilient force-responsive contraction/expansion mechanism 230 can be optimized based on the expected force or type of bicycle that the shock absorbing cradle 200 is designed to receive. The resilient force-responsive contraction/expansion mechanism 230 as presented herein provides for shock absorption to reduce the forces imparted on the bicycle thereby increasing the life of the bicycle.

Figure 4:
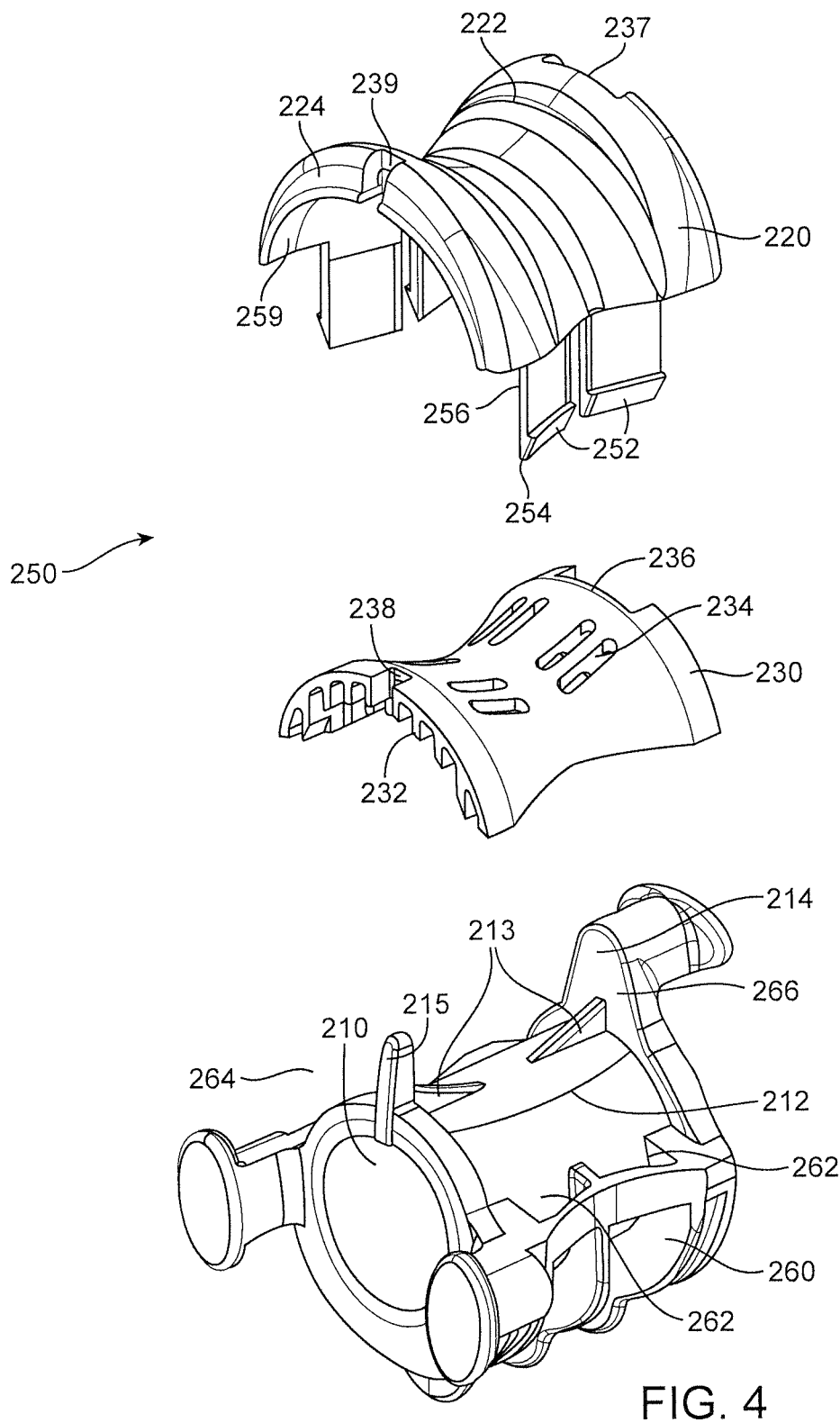
FIG. 4 is a side perspective exploded view of the shock absorbing cradle illustrated in FIG. 2.

FIG. 4 illustrates an exploded view of the exemplary shock absorbing cradle 200 according to the present disclosure. As illustrated the shock absorbing cradle 200 is formed from three releasably coupled components. While three components are illustrated, the shock absorbing cradle 200 can have more or fewer than three components. As illustrated, the resilient force-responsive contraction/expansion mechanism 230 and the layer of buffer material 224 coupled to a buffer layer mounting component 259 collectively form a floating carriage 250.

The floating carriage 250 can be configured to be releasably connected to an arm receiving base 260. As illustrated, the floating carriage 250 can have a top layer composed of the buffer layer 224 coupled to a buffer layer mounting component 259. In the illustrated example, the top layer can include a barbed insert 252 coupled to the floating carriage 250 that can be stab-inserted into a slot receiver 262 on the arm receiving base 260. However, in other examples, the buffer layer can include no barbed insert. The barbed insert 252 can include a distal end 254 of an extension member 256 that translates within the slot receiver 262 on the arm receiving base 260 as the carriage 250 floats relative to the arm receiving base 260. The length of the extension member 256 allows for the floating of the carriage 250 relative to the arm receiving base 260. The arm receiving base 260 is configured to couple to the arm 12 of the carrier 10.

In other implementations, the coupling of the floating carriage 250 can be through other fixed or reliable configurations. For example a sliding collar arrangement can be implemented. Additionally elastic bands can be coupled to the floating carriage 250 and the arm receiving base 260. These configurations allow for the floating carriage 250 to float relative to the arm receiving base 260.

The buffer layer 224 forms an upper surface 222 of the bicycle top tube engaging surface 220. The buffer layer 224 can have a hardness of approximately 55 to 65 Shore A hardness. The hardness of the buffer layer 224 can be selected in dependence upon the terrain that the shock absorbing cradle 200 is to be used. Additionally, the hardness of the buffer layer 224 can be selected in dependence on the type of bicycle that is to be carried thereon.

The shock absorbing cradle 200 can also include an interference member 212. The interference member 212 can have an upper end 214 approximately level with the bicycle top tube engaging surface 220 whereby the layer of buffer material 224 is protected from damaging side abutments by a bicycle top tube when a bicycle is loaded thereupon. The interference member 212 can be located on two ends of the buffer material 224 such that the interference member 212 is substantially parallel to the direction of the top tube of the bicycle when it is loaded onto the upper surface 222 of the buffer material 224. The interference member 212 can be constructed of a hard plastic material. The hard plastic material can have a hardness of approximately 70 to 80 Shore A durometer hardness. The interference members 212 can include a first post 215 and a second post 266. The first post 215 can be received in a first post receiving portion 238 of the resilient force-responsive contraction/expansion mechanism 230. The first post receiving portion 238 allows for a closer fit between the resilient force-responsive contraction/expansion mechanism 230 and the inference member 212 in the form of the first post 215. This further enables protection of the buffer layer 224 as it can be mounted so that it does not protrude yet provides a portion that resists damaging the buffer layer 224. The buffer layer 224 and buffer layer mounting component 259 can have a first post receiving portion 239 as well. Likewise, the second post 266 can be accommodated by the first post receiving portion 236 of the resilient force-responsive contraction/expansion mechanism 230. The resilient force-responsive contraction/expansion mechanism 230 can also have carriage engagement slots 234 formed therein to releasably couple the resilient force-responsive contraction/expansion mechanism 230 to the buffer layer mounting component.

In the illustrated embodiment, the arm receiving base 260 can also include carriage control supports 213. The carriage control supports 213 can control the deflection of the floating carriage 250. The carriage control supports 213 allow for increased rigidity of the floating carriage 250. The rigidity allows for the bike tube to be more firmly supported when the floating carriage 250 has elastic properties allowing it to flex. Furthermore, the carriage control supports 213 change the deflection of the floating carriage 250 by interacting with the ribs 232 to prevent certain ribs from moving in a particular direction. Other configurations of the control supports 213 can be created to provide different types of support. For example, when the shock absorbing securement device is a different type of a securement device than the shock absorbing cradle 200, the carriage control supports 213 can be modified to support the desired device.

Figure 5:
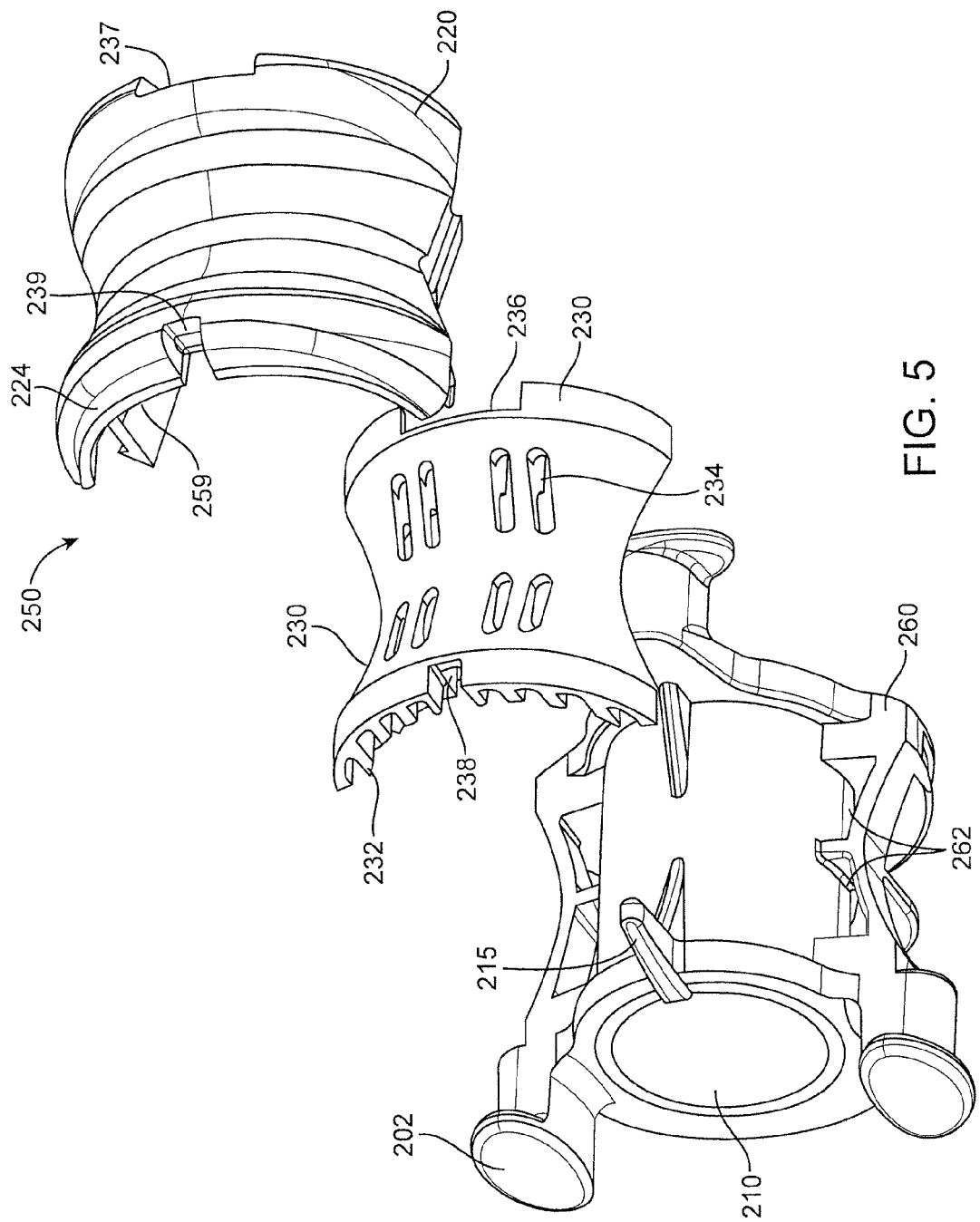
FIG. 5 is a top perspective exploded view of the shock absorbing cradle illustrated in FIG.

FIG. 5 illustrates an exploded top view of the shock absorbing cradle 200 as illustrated in FIG. 2. As seen from this perspective, the upper surface 222 of the bicycle top tube engaging surface is more clearly visible. Additionally, the slot receivers 262 are illustrated from the top perspective view. The barbed insert 252 can engage within the respective slot receiver 262 so as to allow the extension member 256 to slide within the slot receiving portion 262 yet retain the floating carriage 250 from being decoupled from the arm receiving base 260.

Figure 6:
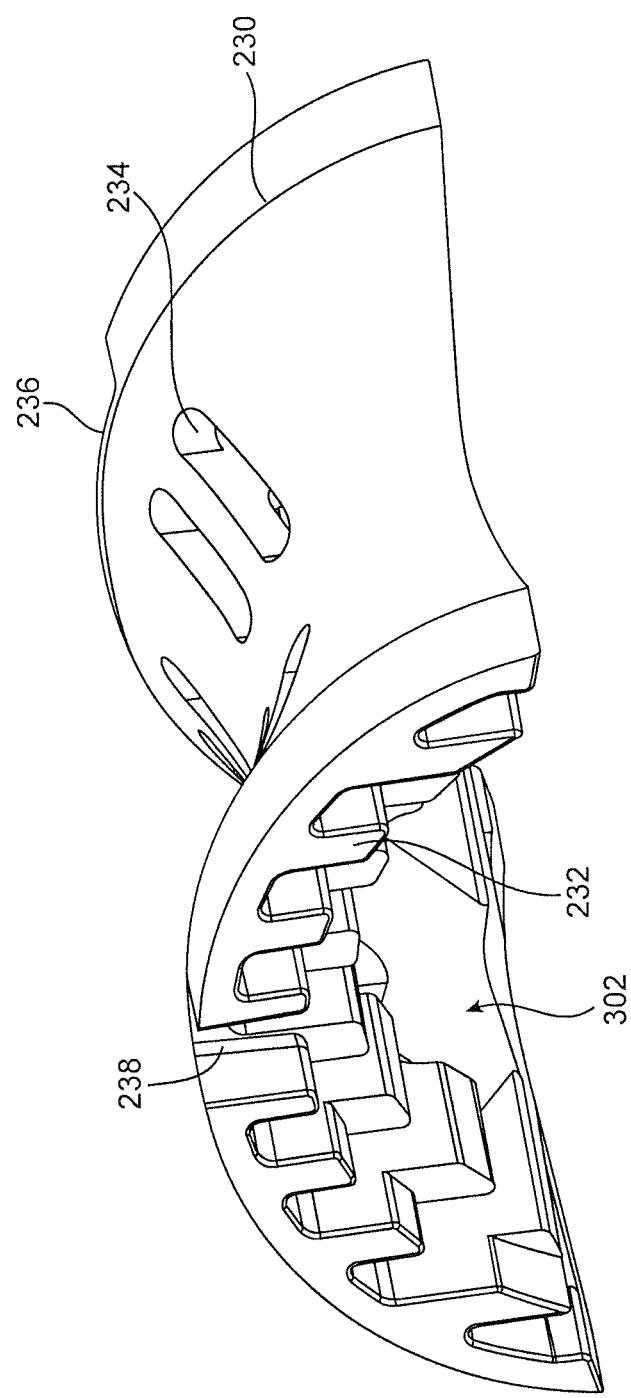
FIG. 6 is a side perspective view of the contraction/expansion mechanism illustrated in FIG. 2.

A detailed perspective view of the resilient force-responsive contraction/expansion mechanism 230 is illustrated in FIG. 6. As shown, a plurality of ribs 232 extends downwardly from the resilient force-responsive contraction/expansion mechanism 230. These ribs 232 are configured to engage with a top surface of the arm receiving base 260. FIG. 6 also illustrates the voidspace 302 formed by the contraction/expansion mechanism 230. In the example implementation illustrated in FIG. 6, the plurality of ribs 232 can partition the voidspace 302. As discussed above, when the ribs 232 absorb shock exerted by a bicycle on the carrier, the ribs 232 can be compressed or deflected into the voidspace 302. A plurality of slots 234 are formed through the resilient force-responsive contraction/expansion mechanism 230. While a plurality of slots 234 are illustrated, only one slot 234 can be implemented. The slots 234 allow the resilient force-responsive contraction/expansion mechanism 230 to remain in a relative position to the buffer layer 224. In other embodiments, the resilient force-responsive contraction/expansion mechanism 230 can be affixed to the buffer layer 224.

Figure 7:
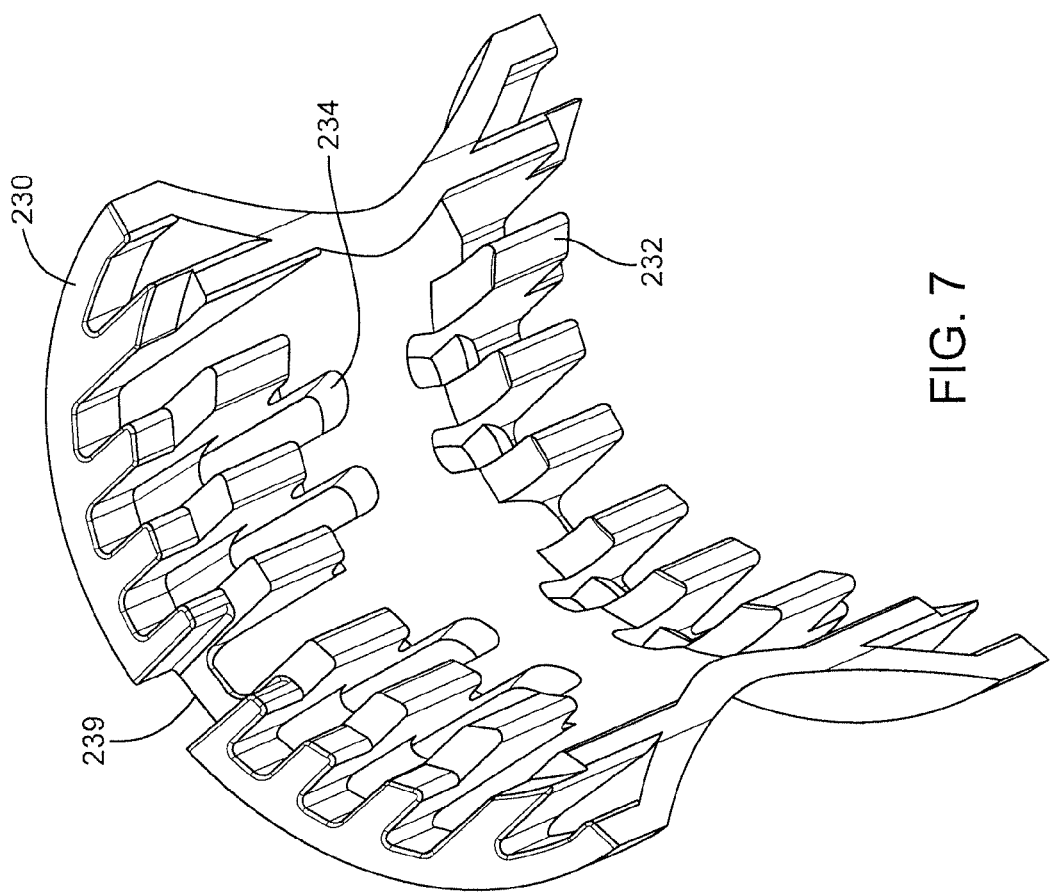
FIG. 7 is a bottom perspective view of the contraction/expansion mechanism illustrated in FIG. 2.

FIG. 7 illustrates a bottom perspective view of the resilient force-responsive contraction/expansion mechanism 230. The spacing of the plurality of ribs 234 is illustrated. As illustrated, the plurality of ribs 234 is located along two edges of the resilient force-responsive contraction/expansion mechanism 230. There are no ribs 234 located in the middle of the resilient force-responsive contraction/expansion mechanism 230. In other embodiments, the spacing and location of the ribs 234 can be varied from that as illustrated. Additionally, other components can be implemented in addition to the ribs 234 as described above.

Figure 8:
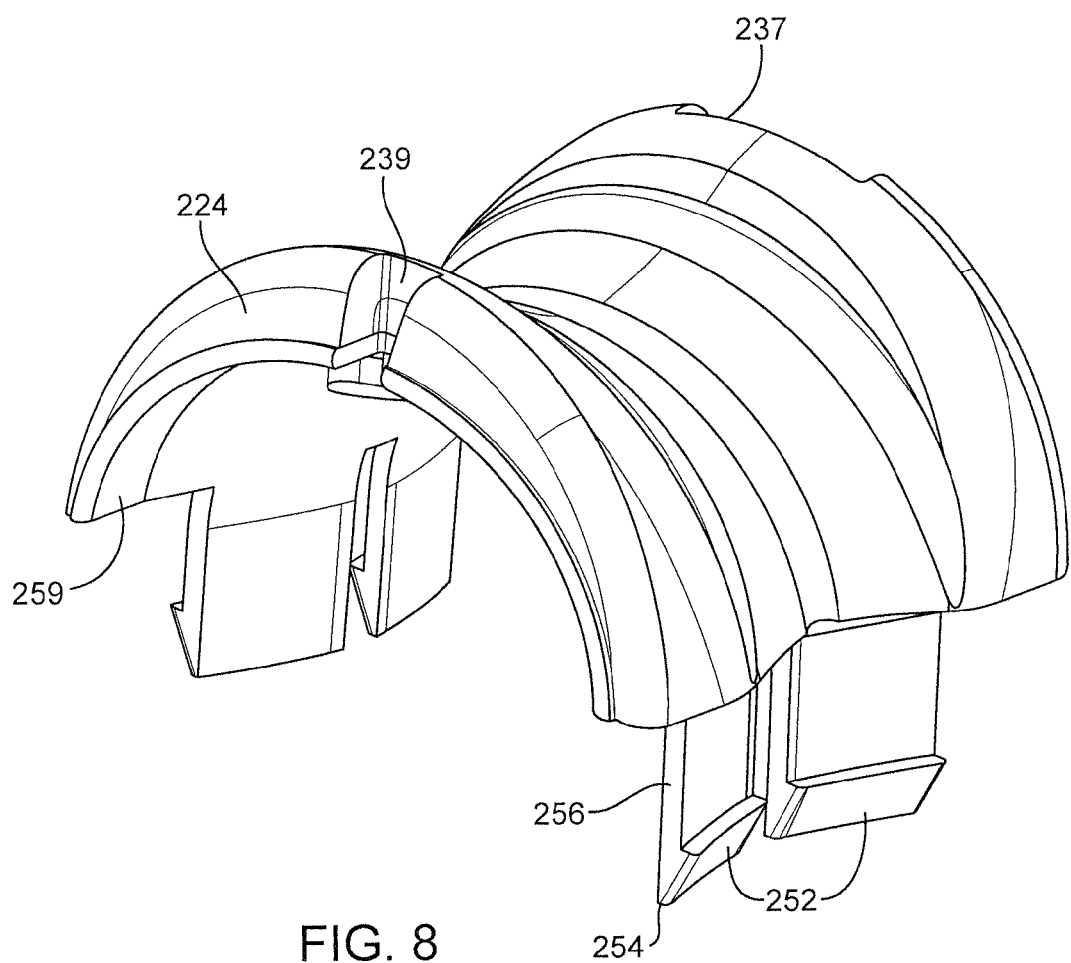
FIG. 8 is a side perspective view of an upper portion of the floating carriage illustrated in FIG. 2.

FIG. 8 illustrates a side perspective view of an upper portion of the floating carriage 250. As shown the upper portion has a buffer material 224 and a buffer material support layer 259. The buffer support layer 259 terminates at ends that have barbs 254. The buffer material support layer 259 has extensions 256 between the barbs 252 and the buffer material. While the buffer material support layer 259 has the barbs 252 formed thereon in the illustrated example, other examples can have the barbs 252 formed from different material or be coupled to the buffer material support layer 259. In still other examples, the buffer support layer 259 can include no barbs 252.

Figure 9:
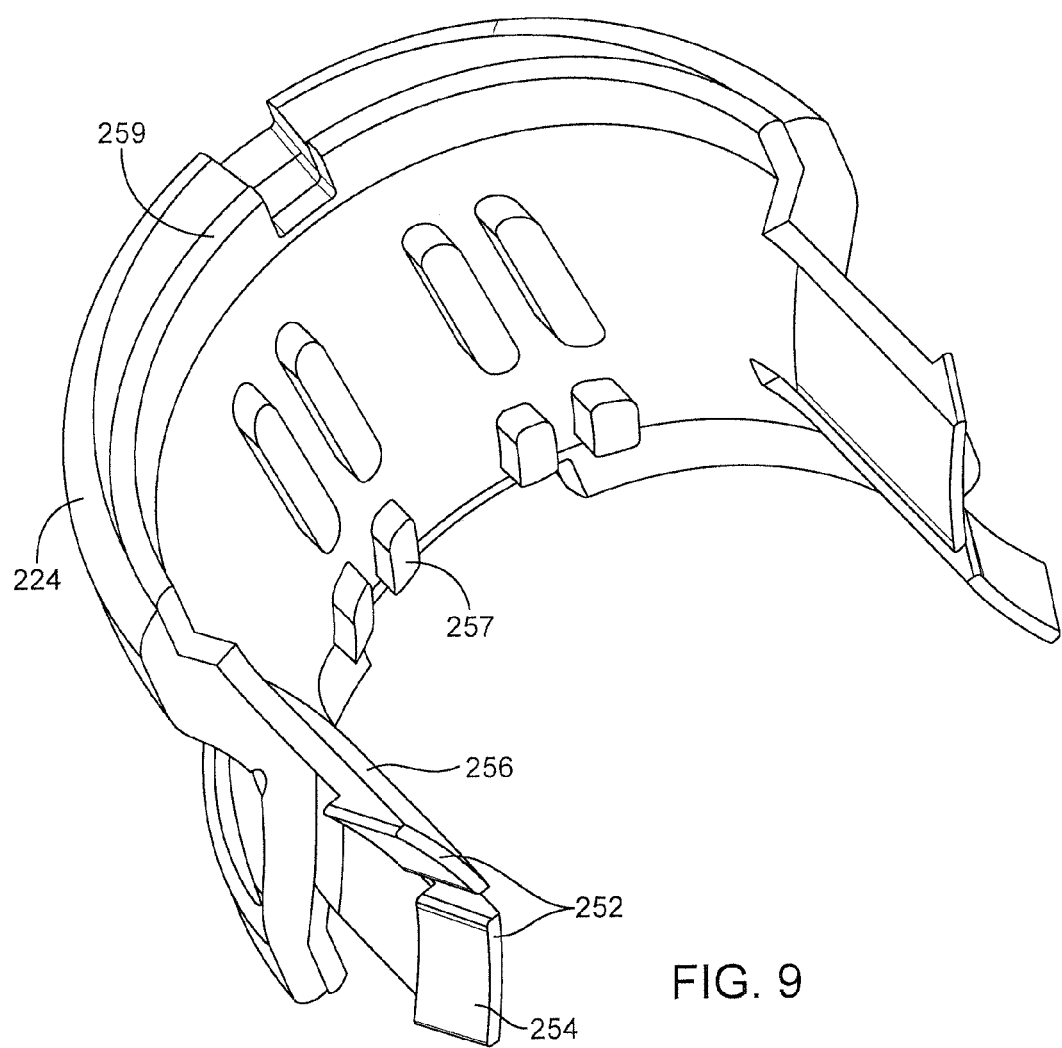
FIG. 9 is a bottom perspective view of an upper portion of the floating carriage illustrated in FIG. 2.

FIG. 9 is a bottom perspective view of an upper portion of the floating carriage 250. The upper portion of the floating carriage 250 includes protrusions 257 to engage with the slots 234 of the resilient force-responsive contraction/expansion mechanism 230.

Figure 10:
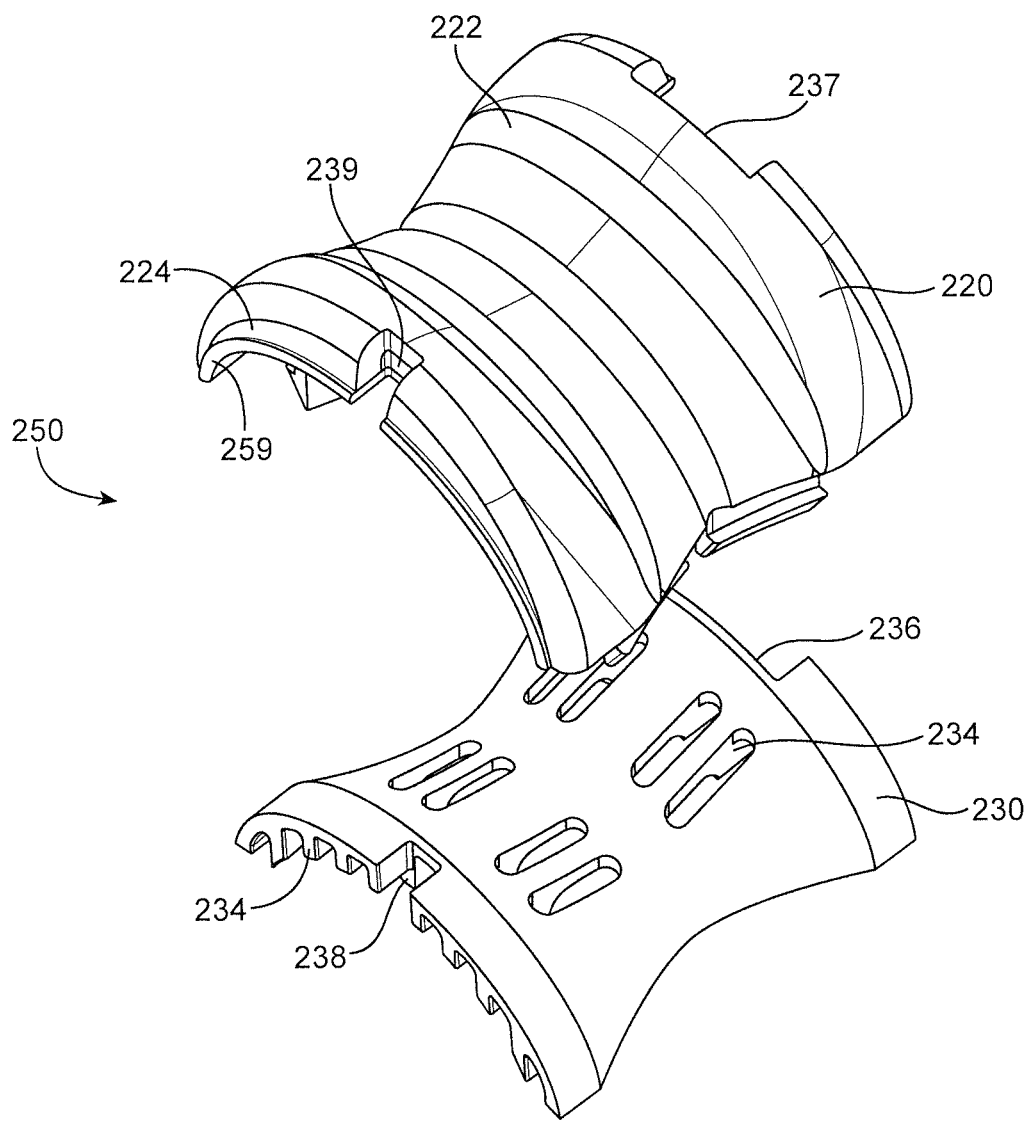
FIG. 10 is a top perspective exploded view of the floating carriage illustrated in FIG. 2.

FIG. 10 is a top perspective exploded view of the floating carriage 250.

Exemplary implementations have been described hereinabove regarding the implementation of a shock absorbing securement device. Various modifications to and departures from the disclosed implementations will occur to those having skill in the art. The subject matter that is intended to be within the spirit of this disclosure is set forth in the following claims.

What is claimed is:

1. A shock absorbing cradle for supporting a bicycle on an arm of a bicycle carrier, the cradle comprising:
   an arm receiving base having a bicycle carrier arm engaging surface configured to engage an arm of the bicycle carrier; and
   a floating carriage releasably coupled to the arm receiving base, the floating carriage comprising:
      an upper portion having a bicycle engaging surface configured to engage a portion of the bicycle;
      a resilient member disposed between the upper portion and the arm receiving base; and
      a first extension member configured to be inserted into a first slot receiver of the arm receiving base to couple the floating carriage to the arm receiving base,
      wherein the first extension member translates within the first slot receiver of the arm receiving base as the carriage moves relative to the arm receiving base.

2. The shock absorbing cradle of claim 1, wherein a distal end of the first extension member comprises a barbed insert configured to be stab-inserted into the first slot receiver.

3. The shock absorbing cradle of claim 2, wherein the barbed insert is configured to engage within the first slot receiver to allow the first extension member to slide within the first slot receiver while retaining the floating carriage from being decoupled from the arm receiving base.

4. The shock absorbing cradle of claim 1, wherein the floating carriage further comprises a second extension member configured to be inserted into a second slot receiver of the arm receiving base.

5. The shock absorbing cradle of claim 1, wherein the first extension member extends from the upper portion of the floating carriage.

6. A shock absorbing securement device for securing a bicycle to a bicycle carrier, the securement device comprising:
   an arm receiving base having a bicycle carrier arm engaging surface configured to engage an arm of the bicycle carrier; and
   a floating carriage releasably coupled to the arm receiving base in a bicycle transporting orientation,
   wherein a plurality of flexible ribs extend from the floating carriage and contact the arm receiving base in the bicycle transporting orientation, and
   wherein the plurality of flexible ribs define a plurality of voidspaces between the floating carriage and the arm receiving base.

7. The shock absorbing securement device of claim 6, wherein the plurality of flexible ribs are configured to absorb shock exerted by the carrier on the bicycle by being compressed or deflected.

8. The shock absorbing securement device of claim 6, wherein at least one flexible rib is longer than one other flexible rib.

9. The shock absorbing securement device of claim 6, wherein the flexible ribs extend in a generally downward direction from the floating carriage in the bicycle transporting orientation.

10. The shock absorbing securement device of claim 6, wherein the floating carriage comprises an upper portion and an intermediate member.

11. The shock absorbing securement device of claim 10, wherein the at least one flexible rib extends from the intermediate member.

12. A bicycle carrier, comprising:
   a shock absorbing cradle for supporting a bicycle, the cradle comprising:
      an arm receiving base having a bicycle carrier arm engaging surface; and
      a floating carriage releasably coupled to the arm receiving base, the floating carriage comprising:
         an upper portion comprising:
            a bicycle engaging surface; and
            a lower surface having at least one protrusion; and
         an intermediate member having at least one slot through the intermediate member,
         wherein the protrusion of the upper portion extends through the slot of the intermediate member to releasably couple the upper portion with the intermediate member.

13. The bicycle carrier of claim 12, wherein the upper portion comprises a plurality of protrusions and the intermediate member comprises a plurality of slots, and wherein each protrusion engages a respective slot.

14. The bicycle carrier of claim 12, wherein the floating carriage further comprises a first extension member configured to releasably couple the floating carriage to the arm receiving base.

15. The bicycle carrier of claim 14, wherein the first extension member translates within a first slot receiver of the arm receiving base as the carriage moves relative to the arm receiving base.

16. The bicycle carrier of claim 14, wherein a distal end of the first extension member comprises a barbed insert configured to be stab-inserted into a first slot receiver of the arm receiving base to allow the extension member to slide within the slot receiver while retaining the floating carriage from being decoupled from the arm receiving base.

17. The bicycle carrier of claim 14, wherein the floating carriage further comprises a second extension member configured to be inserted into a second slot receiver of the arm receiving base.

18. The bicycle carrier of claim 14, wherein the first extension member extends from the upper portion of the floating carriage.

19. The bicycle carrier of claim 12, wherein the bicycle engaging surface is configured to engage a top tube of a bicycle.

* * * * *